Sept. 18, 1923.
F. H. SMITH
CAN HOLDER AND PERFORATOR
Filed April 2, 1923
1,468,041
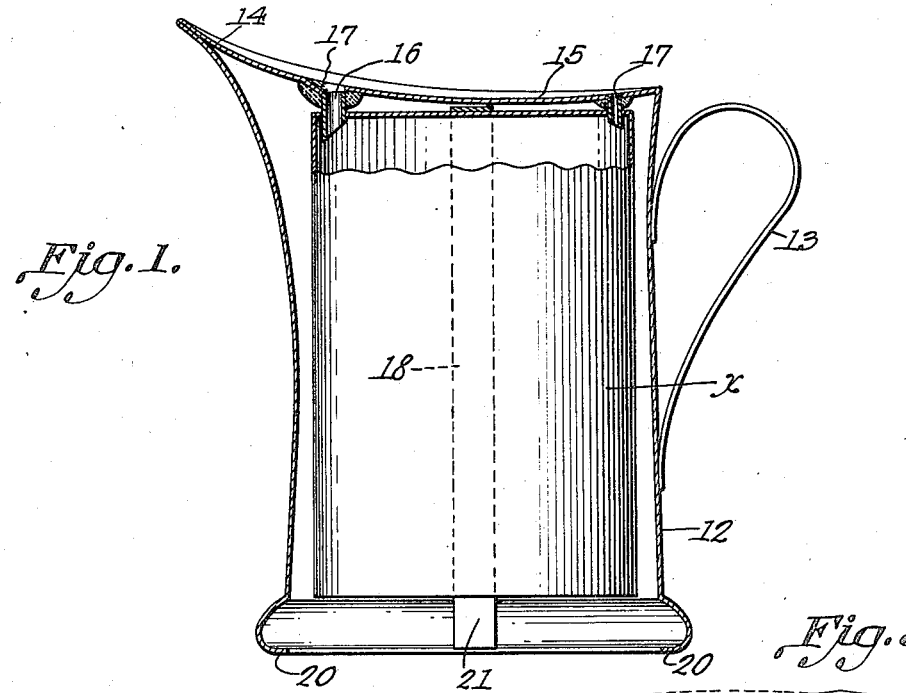
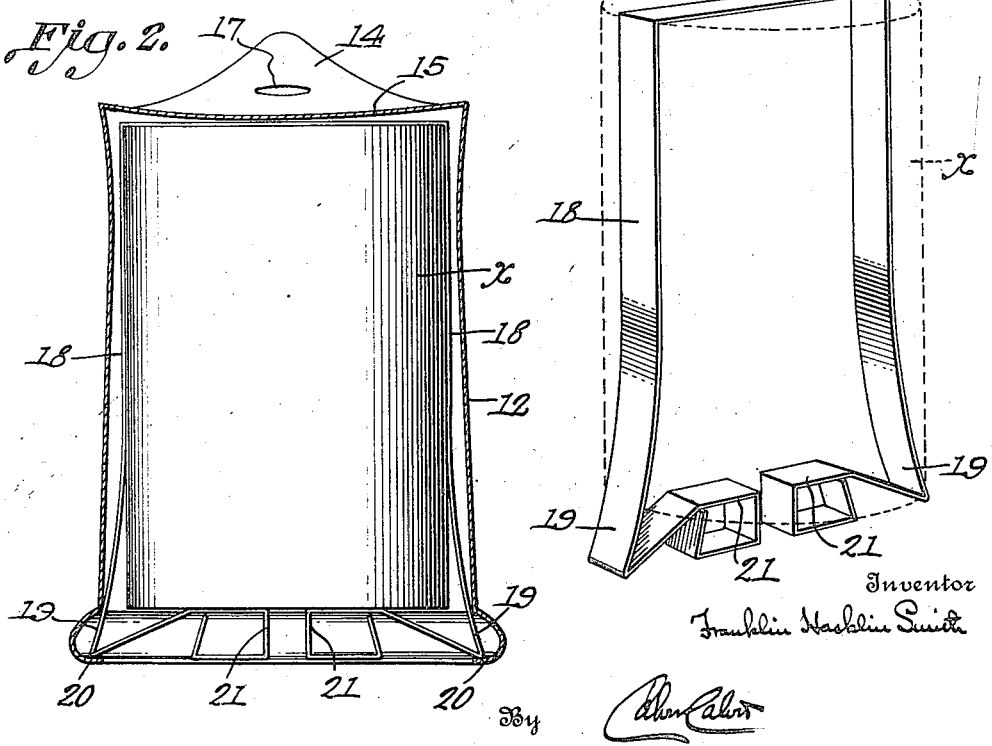

Patented Sept. 18, 1923.                                                 1,468,041

UNITED STATES PATENT OFFICE.

FRANKLIN HASKLIN SMITH, OF BURKBURNETT, TEXAS.

CAN HOLDER AND PERFORATOR.

Application filed April 2, 1923.  Serial No. 629,349.

*To all whom it may concern:*

Be it known that I, FRANKLIN HASKLIN SMITH, a citizen of the United States, residing at Burkburnett, in the county of Wichita and State of Texas, have invented or discovered certain new and useful Improvements in Can Holders and Perforators, of which the following is a specification, reference being had therein to the accompanying drawing.

This invention relates to a receptacle made in the form of a pitcher for holding a can of condensed milk or other substance and which is of such construction that the liquid may be conveniently poured from the can while the liquid remaining in the can will be properly protected.

In the accompanying drawing Figs. 1 and 2 are vertical sectional views, at right angles to each other, of the improved can holder. Fig. 3 is a perspective view showing a spring can-retaining and removing device.

Referring to the drawing, 12 denotes the body portion of the receptacle which is preferably formed of sheet metal and provided with a handle 13 and a pour-out spout 14. The receptacle 12 is open at its bottom but closed at its top, and the closed top 15 is preferably formed concave and is provided on its under side, inside of the receptacle 12, with a pointed perforating discharge or dispensing tube 16 and a pointed perforating vent tube 17, these tubes being attached to the top 15 by solder or in any other suitable manner. The upper end of the tube 16 is preferably located slightly below the surface of the top 15, and, communicating with said tube, is a small recess or pocket 17 adapted to receive drainage from the inclined spout 14, so that any of the liquid remaining on the said spout, after a pour-out operation, will drain back into the said pocket and tube 16 to be returned to the can.

A can x of condenser milk or other substance may be removably secured in the receptacle 12 by a spring-retaining device or holder 18 consisting preferably of a loop of flat resilient metal adapted to pass over the top of the can, the lower members 19 of said loop naturally springing outward so as to engage an annular in-turned lip 20 at the bottom of the receptacle 12, as shown in Fig. 2. At the bottom of these outwardly springing arms 19 the strip of metal forming the loop is bent inward and slightly upward forming supports 21 on which the can x may rest, these supports 21 being separated a sufficient distance from each other to enable them to be closed together in releasing the spring members 19 from the annular lip 20. These supports 21 are also adapted to be grasped by the user to handle the can in placing it in and removing it from the receptacle 12.

In the use of the invention a can x will first be inserted in the spring holder 18 and the said holder and can will then be inserted in the bottom of the receptacle 12. The receptacle will then be pressed downward on the can, or the can will be pressed upward against the top of the receptacle, so as to cause the perforators 16 and 17 to be forced through the top of the can to provide proper discharge and vent openings. In inserting a can in the receptacle 12, a can will be placed in the holder 18 and the supports 21 will be engaged by the thumb and finger of the operator to press these supports toward each other, and this pressing operation will be repeated in removing the can from the receptacle, as moving said supports toward each other will disengage the spring arms 19 from the annular lip 20 at the bottom of the receptacle 12.

It will thus be seen that the invention provides a simple construction by which a can of condensed milk or other liquid may be readily inserted into and removed from a pour-out or dispensing receptacle or pitcher; and when in the said receptacle or pitcher the contents of the can may be dispensed as may be desired, and any liquid remaining on the spout of the receptacle will be readily returned into the can when the receptacle is placed in an upright position.

Having thus described my invention I claim and desire to secure by Letters Patent:

1. A receptacle, for holding a can of condensed milk or the like, consisting of a body having a closed top and an open bottom and provided with a handle and a spout and also with an inwardly extending lip at its bottom, the closed top of said receptacle being provided on its under side with perforating discharge and vent tubes, combined with a retaining and removing device consisting of an open loop of spring metal within which a can may be placed, and which is constructed to extend up the sides and over the top of the can, said loop having at its lower part outwardly springing arms adapted to engage said inwardly extending lip at the bottom of said receptacle.

2. A receptacle, for holding a can of condensed milk or the like, consisting of a body having a closed top and an open bottom and provided with a handle and a spout and also with an inwardly extending lip at its bottom, the closed top of said receptacle being provided on its under side with perforating discharge and vent tubes, combined with a retaining and removing device consisting of an open loop of spring metal within which a can may be placed, and which is constructed to extend up the sides and over the top of the can, said loop having at its lower part outwardly springing arms adapted to engage said inwardly extending lip at the bottom of said receptacle, said loop comprising at its bottom supports on which the can may rest and which supports are connected with said spring arms.

In testimony whereof I affix my signature.

FRANKLIN HASKLIN SMITH.